US012646637B2

(12) United States Patent
Yoshihara et al.

(10) Patent No.: US 12,646,637 B2
(45) Date of Patent: Jun. 2, 2026

(54) METHOD OF MANUFACTURING SUPERCONDUCTING WIRE

(71) Applicant: SUMITOMO ELECTRIC INDUSTRIES, LTD., Osaka (JP)

(72) Inventors: Tatsuhiko Yoshihara, Osaka (JP); Tatsuoki Nagaishi, Osaka (JP); Genki Honda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 441 days.

(21) Appl. No.: 18/210,681

(22) Filed: Jun. 16, 2023

(65) Prior Publication Data

US 2024/0282485 A1 Aug. 22, 2024

(30) Foreign Application Priority Data

Feb. 22, 2023 (JP) ................................ 2023-025805

(51) Int. Cl.
*H01B 13/00* (2006.01)
*H01B 12/06* (2006.01)

(52) U.S. Cl.
CPC ......... *H01B 13/0016* (2013.01); *H01B 12/06* (2013.01)

(58) Field of Classification Search
CPC .... H01B 12/06; H01B 13/0016; H01B 13/22; Y02E 40/60
USPC ............................................................ 156/51
See application file for complete search history.

(56) References Cited

U.S. PATENT DOCUMENTS

2009/0286686 A1 11/2009 Teranishi et al.
2018/0025812 A1 1/2018 Ohki et al.
2020/0152359 A1* 5/2020 Smathers .............. H01B 12/06

FOREIGN PATENT DOCUMENTS

JP 2007-165153 A 6/2007
JP 2010-165502 A 7/2010
JP 2011-253768 A 12/2011
JP 2012-129084 A 7/2012
JP 2012-146418 A 8/2012
JP 2012-174567 A 9/2012
JP 2013-235765 A 11/2013
JP 5556410 B 7/2014
(Continued)

*Primary Examiner* — James D Sells
(74) *Attorney, Agent, or Firm* — Renner, Otto, Boisselle & Sklar, LLP

(57) ABSTRACT

Forming an oxide superconducting film includes a step of laminating a superconducting layer of an oxide superconducting material. The step of laminating the superconducting layer includes a pyrolyzed film forming step, a polycrystallization step, and a sintering heat treatment step. The pyrolyzed film forming step includes a coating film forming step and a pyrolyzing heat treatment step. In the coating film forming step, a solution of a metal organic compound is applied to form a coating film. In the pyrolyzing heat treatment step, the coating film is heat-treated to thermally decompose an organic component of the metal organic compound so as to form a pyrolyzed film. In the polycrystallization step, the pyrolyzed film is heat-treated to form a polycrystal layer containing polycrystals of the oxide superconducting material. In the sintering heat treatment step, the polycrystal layer is heat-treated to orient the polycrystals so as to form the superconducting layer.

10 Claims, 4 Drawing Sheets

(56) References Cited

FOREIGN PATENT DOCUMENTS

| | | | |
|---|---|---|---|
| JP | 2017-016841 | A | 1/2017 |
| WO | 2007/069524 | A1 | 6/2007 |
| WO | 2016/129469 | A1 | 8/2016 |
| WO | 2018/211766 | A1 | 11/2018 |
| WO | 2021/241282 | A1 | 12/2021 |

* cited by examiner

METHOD OF MANUFACTURING SUPERCONDUCTING WIRE

This nonprovisional application is based on Japanese Patent Application No. 2023-025805 filed on Feb. 22, 2023, with the Japan Patent Office, the entire contents of which are hereby incorporated by reference.

TECHNICAL FIELD

The present disclosure relates to a method of manufacturing a superconducting wire.

BACKGROUND

Japanese Patent Laying-Open No. 2007-165153 discloses a method of manufacturing a superconducting wire that includes a step of forming an oxide superconducting film by a metal organic decomposition (MOD) process. The method of forming an oxide superconducting film by the MOD process includes the following steps. A solution, in which metal organic compounds containing an organic compound of a rare earth element (RE), an organic compound of barium (Ba), and an organic compound of copper (Cu) are dissolved, is applied to a substrate to form a coating film on the substrate. The coating film is heat-treated (pyrolyzed) at a temperature of about 500° C. to thermally decompose organic components of the metal organic compounds contained in the coating film to form a pyrolyzed film. The pyrolyzed film is further heat-treated (sintered) at a higher temperature (for example, a temperature of about 800° C.) to form the oxide superconducting film.

SUMMARY

A method of manufacturing a superconducting wire according to an aspect of the present disclosure includes a step of forming an oxide superconducting film on a support substrate. The step of forming the oxide superconducting film includes a step of laminating a superconducting layer of an oxide superconducting material for at least one time. The step of laminating the superconducting layer includes a pyrolyzed film forming step, a polycrystallization step, and a sintering heat treatment step. The pyrolyzed film forming step includes performing a coating film forming step and a pyrolyzing heat treatment step for at least one time. In the coating film forming step, a solution of a metal organic compound is applied to form a coating film. The metal organic compound is a compound of a metal element constituting the oxide superconducting material and an organic component. In the pyrolyzing heat treatment step, the coating film is heat-treated to thermally decompose the organic component so as to form a pyrolyzed film. In the polycrystallization step, the pyrolyzed film is heat-treated to form a polycrystal layer containing polycrystals of the oxide superconducting material. In the sintering heat treatment step, the polycrystal layer is heat-treated to orient the polycrystals so as to form the superconducting layer.

DETAILED DESCRIPTION

Figure 1:
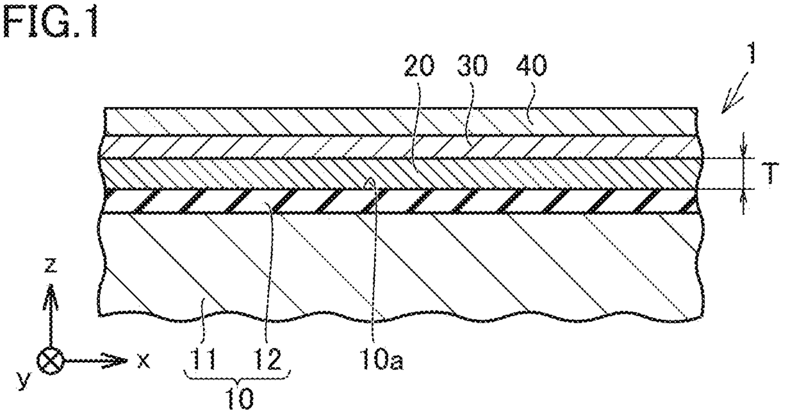
FIG. 1 is a schematic cross-sectional view illustrating a superconducting wire according to a first embodiment and a second embodiment.

Problem to be Solved by the Present Disclosure

An oxide superconducting film of a superconducting wire needs to have a high degree of orientation. However, the method of manufacturing a superconducting wire disclosed in Japanese Patent Laying-Open No. 2007-165153 has a problem that, although the degree of orientation of the oxide superconducting film may be increased, the heat treatment time is long. Therefore, it is desirable to increase the degree of orientation of the oxide superconducting film while reducing the time required for manufacturing the superconducting wire. The present disclosure has been made in view of the abovementioned problem, and an object thereof is to provide a method of manufacturing a superconducting wire that includes an oxide superconducting film having a high degree of orientation while reducing a manufacturing time of the superconducting wire.

Advantageous Effect of the Present Disclosure

According to the method of manufacturing a superconducting wire of the present disclosure, it is possible to increase the degree of orientation of the oxide superconducting film while reducing the manufacturing time of the superconducting wire.

DESCRIPTION OF EMBODIMENTS

Embodiments of the present disclosure will be described in a list.

(1) The method of manufacturing a superconducting wire 1 of the present disclosure includes a step of forming an oxide superconducting film 20 on a support substrate 10. The step of forming the oxide superconducting film 20 includes a step of laminating a superconducting layer 25 of an oxide superconducting material (S11) for at least one time. The step of laminating the superconducting layer 25 (S11) includes a pyrolyzed film forming step (S12), a polycrystallization step (S16), and a sintering heat treatment step (S17). The pyrolyzed film forming step (S12) includes performing a coating film forming step (S13) and a pyrolyzing heat treatment step (S14) for at least one time. In the coating film forming step (S13), a solution of a metal organic compound is applied to form a coating film. The metal organic compound is a compound of a metal element constituting the oxide superconducting material and an organic component. In the pyrolyzing heat treatment step (S14), the coating film is heat-treated to thermally decompose the organic component so as to form a pyrolyzed film. In the polycrystallization step (S16), the pyrolyzed film is heat-treated to form a polycrystal layer containing polycrystals of the oxide superconducting material. In the sintering heat treatment step (S17), the polycrystal layer is heat-treated to orient the polycrystals so as to form the superconducting layer 25.

In the polycrystallization step (S16), carbon dioxide ($CO_2$) that impedes orientation of the superconducting film in the sintering heat treatment step (S17) is released from the pyrolyzed film. Therefore, it is possible to reduce the heat treatment time of the sintering heat treatment step (S17) so as to shorten the manufacturing time of the oxide superconducting film 20. Thereby, it is possible to shorten the manufacturing time of the superconducting wire 1.

(2) In the method of manufacturing the superconducting wire 1 according to (1) in the above, the step of forming the oxide superconducting film 20 includes repeating the step of laminating the superconducting layer 25 (S11) for a plurality of times.

Therefore, it is possible to increase the thickness of the oxide superconducting film 20. Thereby, it is possible to increase the critical current of the superconducting wire 1.

(3) In the method of manufacturing the superconducting wire 1 according to (1) or (2) in the above, the pyrolyzed film forming step (S12) includes repeating the coating film forming step (S13) and the pyrolyzing heat treatment step (S14) for a plurality of times.

After the coating film forming step (S13) and the pyrolyzing heat treatment step (S14) have been repeated for a plurality of times, it is necessary to perform the polycrystallization step (S16) and the sintering heat treatment step (S17) for only one time, and thus, it is possible to reduce the number of times of performing the polycrystallization step (S16) and the sintering heat treatment step (S17). Therefore, it is possible to shorten the manufacturing time of the oxide superconducting film 20, which makes it possible to shorten the manufacturing time of the superconducting wire 1.

(4) In the method of manufacturing the superconducting wire 1 according to any one of (1) to (3) in the above, the polycrystallization step (S16) is performed in an atmosphere having an oxygen concentration of 1% or more.

If carbonate contained in the pyrolyzed film is thermally decomposed in the sintering heat treatment step (S17), $CO_2$ is generated from the pyrolyzed film, and the generated $CO_2$ will impede the orientation of the superconducting film. Therefore, it is desirable to thermally decompose the carbonate contained in the pyrolyzed film in the polycrystallization step (S16) to be performed between the pyrolyzed film forming step (S12) and the sintering heat treatment step (S17). On the other hand, if the oxygen concentration in the polycrystallization step (S16) is less than 1%, although the carbonate contained in the pyrolyzed film is thermally decomposed, the crystallization of the superconducting material excessively progresses to increase the size of each of crystal grains constituting the polycrystals, which deteriorates the degree of orientation of the oxide superconducting film. By performing the polycrystallization step (S16) in an atmosphere having an oxygen concentration of 1% or more, it is possible to prevent the size of each of crystal grains constituting the polycrystals of the oxide superconducting material from increasing excessively in the polycrystallization step (S16), which makes it possible to form the oxide superconducting film 20 having a higher degree of orientation. Therefore, it is possible to improve the degree of crystal orientation of the oxide superconducting film 20.

(5) In the method of manufacturing the superconducting wire 1 according to any one of (1) to (4) in the above, the polycrystallization step (S16) is performed at a heat treatment temperature of 700° C. or higher.

Therefore, it is possible to improve the degree of crystal orientation of the oxide superconducting film 20.

(6) In the method of manufacturing the superconducting wire 1 according to any one of (1) to (5) in the above, a heat treatment time of the pyrolyzed film in the polycrystallization step (S16) is 1 minute or more.

Therefore, the carbonate contained in the pyrolyzed film is sufficiently thermally decomposed so as to sufficiently release $CO_2$ from the pyrolyzed film. Thereby, it is possible to improve the degree of crystal orientation of the oxide superconducting film 20.

(7) In the method of manufacturing the superconducting wire 1 according to (6) in the above, the heat treatment time of the pyrolyzed film in the polycrystallization step (S16) is 70 minutes or less.

Since the size of each of crystal grains constituting the polycrystals is prevented from increasing excessively, it is possible to improve the degree of crystal orientation of the oxide superconducting film 20.

(8) In the method of manufacturing the superconducting wire 1 according to any one of (1) to (3) in the above, the polycrystallization step (S16) is performed in an atmosphere having an oxygen concentration of 0.01% or more and less than 1%, and at a heat treatment temperature of 650° C. or higher and lower than 800° C.

Since the oxygen concentration in the polycrystallization step (S16) is 0.01% or more and less than 1%, carbonate contained in the pyrolyzed film is thermally decomposed. When the polycrystallization step (S16) is performed in an atmosphere having an oxygen concentration of less than 1%, the heat treatment temperature is set lower than 800° C. to thereby prevent the size of each of crystal grains constituting the polycrystals of the oxide superconducting material is prevented from increasing excessively, so that the oxide superconducting film 20 having a high degree of crystal orientation can be formed. The degree of crystal orientation of the oxide superconducting film 20 can be improved.

(9) In the method of manufacturing the superconducting wire 1 according to any one of (1) to (8) in the above, in the sintering heat treatment step (S17), a part or all of the polycrystals grow via a liquid phase.

Since the method of manufacturing the superconducting wire 1 includes the polycrystallization step (S16), even if the oxide superconducting film 20 is thick, it is possible to form the oxide superconducting film 20 having a high degree of orientation in a shorter time. Further, the polycrystals formed in the polycrystallization step (S16) are likely to generate a liquid phase of the oxide superconducting material. It is possible for a part of the polycrystals to grow via the liquid phase, which makes it possible to form the oxide superconducting film 20 having a higher degree of orientation. Thereby, it is possible to form the oxide superconducting film 20 with an improved degree of orientation in a shorter time, which makes it possible to manufacture the superconducting wire 1 including the oxide superconducting film 20 with an improved degree of orientation in a shorter time.

(10) In the method of manufacturing the superconducting wire 1 according to any one of (1) to (9) in the above, the oxide superconducting film 20 has a thickness of 1 μm or more.

Therefore, it is possible to increase the critical current of the superconducting wire 1.

DETAILS OF EMBODIMENTS

Hereinafter, the details of the embodiments will be described with reference to the drawings. In the drawings, the same or corresponding portions are denoted by the same reference numerals, and the description thereof will not be repeated. Note that at least a part of the embodiments described below may be arbitrarily combined in any combination.

First Embodiment

With reference to FIG. 1, a superconducting wire 1 of the present embodiment will be described. The superconducting wire 1 includes a support substrate 10 and an oxide superconducting film 20. The superconducting wire 1 may further include a protective layer 30 and a stabilization layer 40.

The support substrate 10 supports the oxide superconducting film 20. The support substrate 10 includes a substrate 11 and an intermediate layer 12. The intermediate layer 12 is disposed on the substrate 11. The substrate 11 is, for example, a cladding material which is obtained by laminating a copper (Cu) layer and a nickel (Ni) layer on a tape formed of stainless steel. The intermediate layer 12 is disposed between the substrate 11 and the oxide superconducting film 20. The intermediate layer 12 is formed as, for example, at least one layer selected from the group consisting of a cerium oxide ($CeO_2$) layer, a yttria-stabilized zirconia (YSZ) layer, a yttria ($Y_2O_3$) layer, and a lanthanum manganate ($LaMnO_3$) layer. The intermediate layer 12 is formed by magnetron sputtering, for example.

The configuration of the support substrate 10 is not limited to that described above. For example, the substrate 11 may be a tape formed of Hastelloy (registered trademark) or the like, and the intermediate layer 12 may be formed as an intermediate layer that includes an IBAD (Ion Beam Assisted Deposition) layer.

The intermediate layer 12 may have a multilayer structure, and may include, for example, a ground layer, an orientation layer, and a cap layer. The ground layer is laminated on the substrate 11. The orientation layer is laminated on the ground layer. The cap layer is laminated on the orientation layer.

The ground layer has any one of a multilayer structure of a diffusion prevention layer and a bed layer, a single layer structure of a diffusion prevention layer, or a single layer structure of a bed layer. It is desirable that the diffusion prevention layer may have a single layer structure or a multilayer structure formed of silicon nitride ($Si_3N_4$), aluminum oxide ($Al_2O_3$, also referred to as "alumina"), GZO ($Gd_2Zr_2O_7$), or the like. The bed layer may have, for example, a single layer structure or a multilayer structure formed of a rare earth oxide such as $Y_2O_3$, $Er_2O_3$, $CeO_2$, $Dy_2O_3$, $Er_2O_3$, $Eu_2O_3$, $Ho_2O_3$, or $La_2O_3$.

Examples of materials forming the orientation layer include metal oxides such as $Gd_2Zr_2O_7$, MgO, $ZrO_2$—$Y_2O_3$ (YSZ), $SrTiO_3$, $CeO_2$, $Y_2O_3$, $Al_2O_3$, $Gd_2O_3$, $Zr_2O_3$, $Ho_2O_3$, or $Nd_2O_3$. The orientation layer may have a single layer structure or a multilayer structure.

Examples of materials forming the cap layer include $CeO_2$, $LaMnO_3$, $Y_2O_3$, $Al_2O_3$, $Gd_2O_3$, or $Zr_2O_3$. The cap layer may have a single layer structure or a multilayer structure.

The support substrate 10 may further include a ground layer (not shown) disposed on the intermediate layer 12. The ground layer improves the degree of orientation of the crystal axis of the oxide superconducting film 20, for example, the degree of orientation in the c-axis direction. The support substrate 10 has a main surface 10*a*. The main surface 10*a* extends in both the longitudinal direction (x direction) of the superconducting wire 1 and the width direction (y direction) of the superconducting wire 1. The main surface 10*a* of the support substrate 10 may be formed by the intermediate layer 12, or may be formed by the ground layer (not shown).

The oxide superconducting film 20 is disposed on the main surface 10*a* of the support substrate 10. The oxide superconducting film 20 is laminated on the support substrate 10 in the normal direction (z direction) of the main surface 10*a*. The oxide superconducting film 20 is in contact with the main surface 10*a*. When the oxide superconducting film 20 is in the superconducting state, an electric current mainly flows in the longitudinal direction (x direction) of the superconducting wire 1. The thickness direction of the oxide superconducting film 20 is the normal direction (z direction) of the main surface 10*a*.

The oxide superconducting film 20 is formed of, for example, an oxide superconducting material such as REBCO. REBCO is an oxide superconductor represented by $REBa_2Cu_3O_x$ (x is 6 to 8, and is more preferably 6.8 to 7). RE represents a rare earth element. RE may be, for example, at least one element selected from the group consisting of yttrium, lanthanum, neodymium, samarium, europium, gadolinium, dysprosium, holmium, erbium, thulium, lutetium, and ytterbium.

Since the crystal grains constituting the lower layer of the oxide superconducting film 20 are oriented, the crystal grains constituting the oxide superconducting film 20 are oriented. For example, the c-axis of the oxide superconducting material is mainly oriented in the normal direction (z direction) of the main surface 10*a* of the support substrate 10. For example, when the substrate 11 includes a copper layer mentioned above, the crystal grains of the copper layer are oriented by heat treatment. When the support substrate 10 includes the intermediate layer 12, the crystal grains of the oxide constituting the intermediate layer 12 may have orientation. For example, when the intermediate layer 12 oriented by IBAD is formed on the substrate 11 such as Hastelloy (registered trademark), the crystal grains constituting the oxide superconducting film 20 formed on the intermediate layer 12 are oriented.

The oxide superconducting film 20 has a thickness T. The thickness T is, for example, 1.0 μm or more and 5.0 μm or less. The thickness T of the oxide superconducting film 20 may be 1.5 μm or more and 5.0 μm or less. When the thickness T of the oxide superconducting film 20 is 1.0 μm or more, it is possible to increase the critical current of the superconducting wire 1. When the thickness T of the oxide superconducting film 20 is 5.0 μm or less, a decrease in the critical current density of the superconducting wire 1 is suppressed, and a good degree of orientation of the oxide superconducting film 20 is easily maintained.

The protective layer 30 is disposed on the oxide superconducting film 20. The protective layer 30 is laminated on the oxide superconducting film 20 in the normal direction (z direction) of the main surface 10*a* of the support substrate

10. The protective layer 30 is formed of silver (Ag), for example. The protective layer 30 may be formed of copper. The stabilization layer 40 is disposed on the protective layer 30. The stabilization layer 40 is laminated on the protective layer 30 in the normal direction (z direction) of the main surface 10*a* of the support substrate 10. The stabilization layer 40 has, for example, a larger thickness than the protective layer 30. The stabilization layer 40 is formed of copper, for example. The protective layer 30 and the stabilization layer 40 prevent the superconducting wire 1 from being burned by bypassing a current flowing through the oxide superconducting film 20 when a quench (a phenomenon that the oxide superconducting film 20 transitions from the superconducting state to the normal state) occurs in the oxide superconducting film 20.

A method of manufacturing the superconducting wire 1 of the present embodiment will be described with reference to FIGS. 2 to 7.

Figure 2:
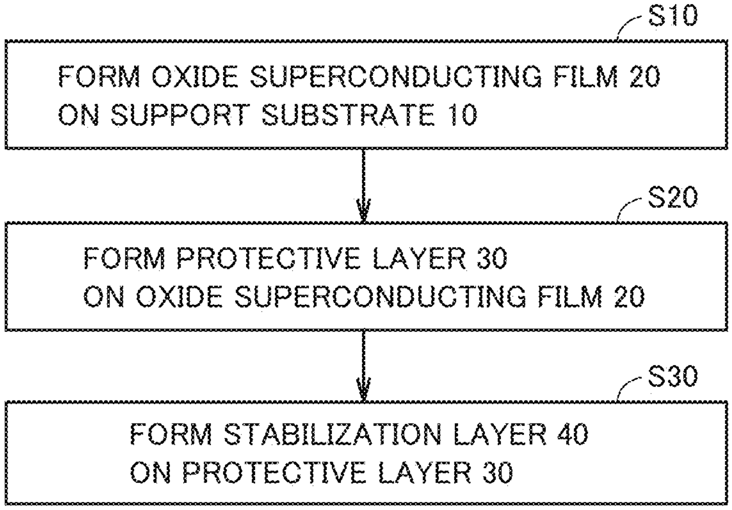
FIG. 2 is a flowchart illustrating a method of manufacturing a superconducting wire according to the first embodiment and the second embodiment.

With reference to FIG. 2, the method of manufacturing the superconducting wire 1 of the present embodiment includes a step of forming the oxide superconducting film 20 on the support substrate 10 (S10), a step of forming the protective layer 30 on the oxide superconducting film 20 (S20), and a step of forming the stabilization layer 40 on the protective layer 30 (S30). In step S20, the protective layer 30 is formed by sputtering, for example. In step S30, the stabilization layer 40 is formed by plating, for example. Hereinafter, step S10 will be described in detail.

Figure 3:
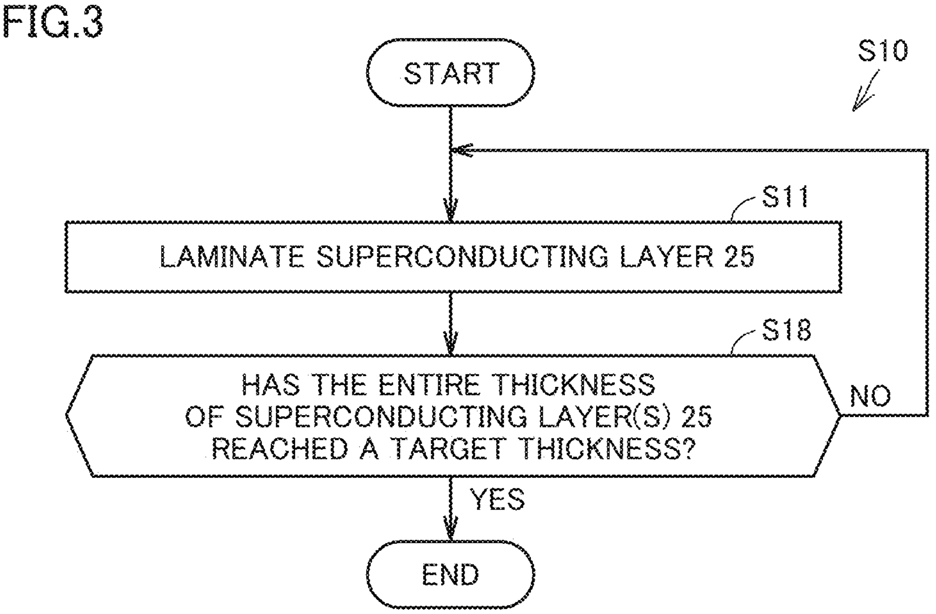
FIG. 3 is a flowchart illustrating a step of forming an oxide superconducting film according to the first embodiment and the second embodiment.

With reference to FIG. 3, the step of forming the oxide superconducting film 20 (S10) includes a step of laminating a superconducting layer 25 of an oxide superconducting material (S11), and a step of determining whether or not the entire thickness of the superconducting layer 25 has reached a target thickness (for example, the thickness T) (S18).

Figure 6:
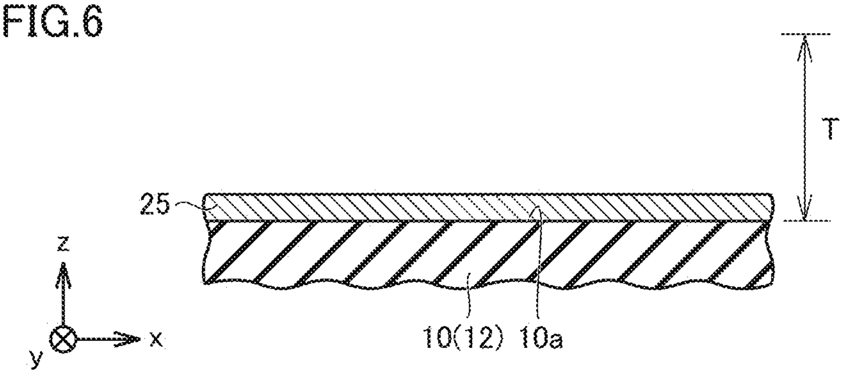
FIG. 6 is a partially enlarged cross-sectional view schematically illustrating a step of forming an oxide superconducting film.
Figure 7:
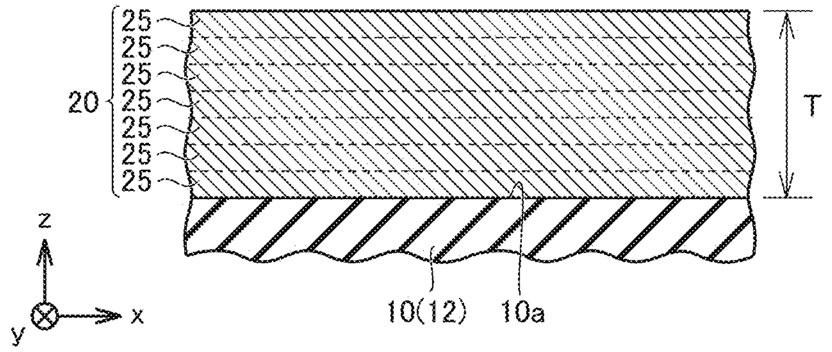
FIG. 7 is a partially enlarged cross-sectional view schematically illustrating a step of forming an oxide superconducting film.

Step S11 is performed for at least one time. When it is determined in step S18 that the entire thickness of the superconducting layer 25 has reached the target film thickness after step S11 is performed for one time, step S10 ends. In this case, the oxide superconducting film 20 is formed by a single superconducting layer 25. As illustrated in FIG. 6, when it is determined in step S18 that the entire thickness of the superconducting layer 25 does not reach the target film thickness (for example, the thickness T) after step S11 is performed for one time, step S11 is repeated for a plurality of times until the entire thickness of the superconducting layer 25 reaches the target film thickness (for example, the thickness T). In this case, as illustrated in FIG. 7, the oxide superconducting film 20 is formed by a plurality of the superconducting layers 25.

Figure 4:
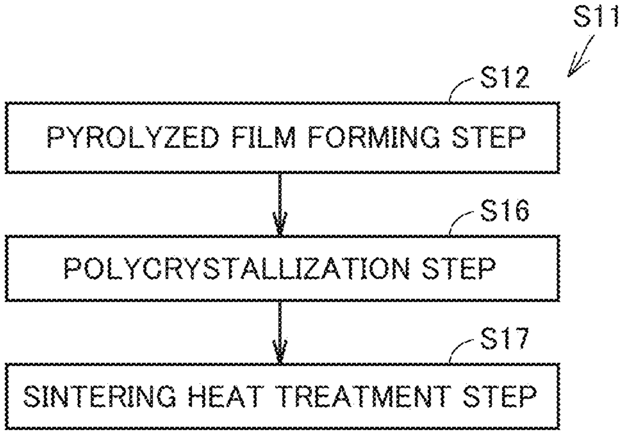
FIG. 4 is a flowchart illustrating a step of laminating a superconducting layer of an oxide superconducting material according to the first embodiment and the second embodiment.
Figure 5:
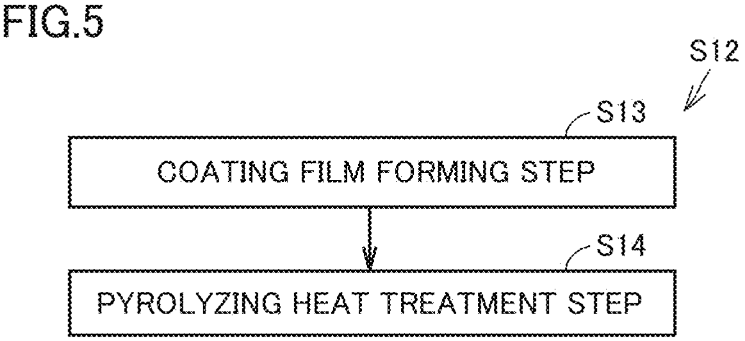
FIG. 5 is a flowchart illustrating a pyrolyzed film forming step according to the first embodiment.

With reference to FIG. 4, the step of laminating the superconducting layer 25 (S11) includes a pyrolyzed film forming step (S12), a polycrystallization step (S16), and a sintering heat treatment step (S17). With reference to FIG. 5, the pyrolyzed film forming step (S12) includes performing a coating film forming step (S13) and a pyrolyzing heat treatment step (S14).

In the coating film forming step (S13), a solution of a metal organic compound is applied and then dried to form a coating film. As the solution of a metal organic compound, a raw material solution to be used in the MOD process may be used. The solution of a metal organic compound may be, for example, a solution obtained by dissolving a metal organic compound in an organic solvent. The metal organic compound is a compound of a metal element constituting the oxide superconducting material and an organic component. In the case of forming a REBCO-based superconducting layer 25, the metal organic compound may be, for example, a carboxylic acid salt of RE, a carboxylic acid salt of Ba, or a carboxylic acid salt of Cu. The carboxylic acid salt may be a monocarboxylic acid salt or a dicarboxylic acid salt. The monocarboxylic acid salt has a high solubility and a high stability in solvents. The monocarboxylic acid salt having 1 to 4 carbon atoms may be, for example, formate, acetate, propionate or butyrate. The dicarboxylic acid salt having 1 to 4 carbon atoms may be, for example, oxalate, malonate or succinate. It is also possible to use any metal organic compound having the other known composition.

The method of coating the solution of a metal organic compound is not particularly limited, and may include a die coating method and an ink jet method. In the step of laminating a first superconducting layer 25, the solution of the metal organic compound is applied to the main surface 10*a* of the support substrate 10. In the step of laminating a second and subsequent superconducting layers 25, the solution of the metal organic compound is applied to the outermost surface of the superconducting layer 25 that has already been formed.

In the pyrolyzing heat treatment step (S14), the coating film is heat-treated to thermally decompose the organic component of the metal organic compound so as to form a pyrolyzed film. For example, the coating film is heat-treated at a heat treatment temperature equal to or higher than a thermal decomposition temperature of the metal organic compound and lower than a generation temperature of the oxide superconducting material. The metal organic compound contained in the coating film is thermally decomposed to form a pyrolyzed film. The pyrolyzed film is mainly formed of a precursor of an oxide superconducting material. The precursor of the oxide superconducting material is composed of an oxide of a metal element constituting the oxide superconducting material and a carbonate of a metal element constituting the oxide superconducting material. In the case of forming a REBCO-based superconducting layer 25, the precursor of the oxide superconducting material is composed of an oxide of a rare earth element (for example, $Gd_2O_3$), a carbonate of Ba (for example, $BaCO_3$), and an oxide of copper (for example, CuO).

The heat treatment temperature of the pyrolyzing heat treatment step (S14) is, for example, about 500° C. The temperature raising rate from room temperature to the heat treatment temperature is, for example, about 0.5 to 20° C./min. The atmosphere in which the pyrolyzing heat treatment step (S14) is performed has, for example, an oxygen concentration of 20% or more. The atmosphere in which the pyrolyzing heat treatment step (S14) is performed may have an oxygen concentration of 50% or more, or may have an oxygen concentration of 100%. In the present specification, the unit of oxygen concentration "%" means a volume proportion. The heat treatment time of the pyrolyzing heat treatment step (S14) is, for example, about 30 minutes. The heat treatment time of the pyrolyzing heat treatment step (S14) may be 10 minutes or less, or may be 2 minutes or less.

As described above, the precursor of an oxide superconducting material used to form the pyrolyzed film includes a carbonate of a metal element constituting the oxide superconducting material (for example, $BaCO_3$). In order to form the oxide superconducting material from the precursor, it is necessary to decompose the carbonate contained in the pyrolyzed film. Then, the polycrystallization step (S16) is performed.

In the polycrystallization step (S16), the pyrolyzed film is heat-treated at a heat treatment temperature higher than the heat treatment temperature of the pyrolyzing heat treatment step (S14). The precursor of the oxide superconducting material chemically reacts to form a polycrystal layer containing polycrystals of the oxide superconducting material. The average grain size determined by averaging respective grain sizes of a plurality of crystal grains constituting the polycrystals is, for example, 300 nm or less. The average grain size may be 200 nm or less, or may be 100 nm or less.

The polycrystallization step (S16) is performed in an atmosphere containing oxygen. The polycrystallization step (S16) is performed, for example, in an atmosphere having an oxygen concentration of 1% or more. Thus, the partial pressure of $CO_2$ generated by thermal decomposition of the carbonate contained in the pyrolyzed film becomes low, and thereby $CO_2$ is sufficiently released from the pyrolyzed film. As a result, the chemical reaction of the precursor of the oxide superconducting material progresses without being impeded by $CO_2$, and thereby the oxide superconducting material is sufficiently generated. Further, since the size of each of crystal grains constituting the polycrystals of the oxide superconducting material is prevented from increasing excessively, it is possible to sufficiently form the polycrystals of the oxide superconducting material. The polycrystallization step (S16) may be performed in an atmosphere having an oxygen concentration of more than 10%, an atmosphere having an oxygen concentration of 11% or more, an atmosphere having an oxygen concentration of 23% or more, an atmosphere having an oxygen concentration of 50% or more, or an atmosphere having an oxygen concentration of 100% (having an oxygen partial pressure of 1 atm).

The polycrystallization step (S16) is performed, for example, at a heat treatment temperature of 700° C. or higher. The heat treatment temperature of the polycrystallization step (S16) may be 750° C. or higher, 780° C. or higher, 800° C. or higher, 810° C. or higher, or 820° C. or higher. The heat treatment temperature of the polycrystallization step (S16) may be 900° C. or lower, or may be 860° C. or lower. The heat treatment time of the pyrolyzed film in the polycrystallization step (S16) is 1 minute or more. The heat treatment time of the pyrolyzed film in the polycrystallization step (S16) may be 10 minutes or more. The heat treatment time of the pyrolyzed film in the polycrystallization step (S16) may be 120 minutes or less, 70 minutes or less, or 60 minutes or less.

The polycrystallization step (S16) is performed, for example, in an atmosphere having an oxygen concentration of 0.01% or more and less than 1%, and at a heat treatment temperature of 650° C. or higher and lower than 800° C. Since the oxygen concentration and the heat treatment temperature fall in respective ranges specified above, the partial pressure of $CO_2$ generated by thermal decomposition of the carbonate contained in the pyrolyzed film becomes low, and thereby $CO_2$ is sufficiently released from the pyrolyzed film. As a result, the chemical reaction of the precursor of the oxide superconducting material progresses without being impeded by $CO_2$, and thereby the oxide superconducting material is sufficiently generated. Moreover, since the oxygen concentration and the heat treatment temperature fall in respective ranges specified above, the size of each of crystal grains constituting the polycrystals of the oxide superconducting material is prevented from increasing excessively, so that it is possible to sufficiently form the polycrystals of the oxide superconducting material. The heat treatment time of the pyrolyzed film in this case may be 1 minute or more, or 10 minutes or more. The heat treatment time of the pyrolyzed film may also be 120 minutes or less, 70 minutes or less, or 60 minutes or less.

In the sintering heat treatment step (S17), the polycrystal layer is heat-treated at a temperature equal to or higher than the generation temperature of the oxide superconducting material to orient the polycrystals. Thus, the superconducting layer 25 having an improved degree of crystal orientation is obtained. The heat treatment temperature of the sintering heat treatment step (S17) is, for example, 780° C. or more and 870° C. or less. The atmosphere of the sintering heat treatment step (S17) is, for example, an argon atmosphere containing oxygen. The oxygen concentration in the atmosphere is, for example, more than 0 ppm and 3000 ppm or less. The oxygen concentration may be 1000 ppm or less. In the sintering heat treatment step (S17), the temperature raising rate to the heat treatment temperature and the temperature lowering rate from the heat treatment temperature are, for example, 10° C./min or more and 1000° C./min. The temperature raising rate and the temperature lowering rate may be identical to or different from each other. In the atmosphere, the temperature is raised from room temperature to the heat treatment temperature, and thereafter lowered.

In the sintering heat treatment step (S17), a part of the polycrystals may grow via a liquid phase. For example, the temperature and the atmosphere of the sintering heat treatment step (S17) are adjusted to enable the liquid phase to be generated in the above-defined range of the temperature and the above-defined range of the oxygen concentration in the atmosphere. By the adjustments, a part of the polycrystals grows via the liquid phase. Note that conditions for melting a part of the polycrystals may be appropriately set depending on the kind, composition and the like of the oxide superconducting material.

Second Embodiment

A method of manufacturing the superconducting wire 1 of the present embodiment will be described with reference to FIGS. 1 to 4 and 6 to 8. The method of manufacturing the superconducting wire 1 of the present embodiment includes the same steps as the method of manufacturing the superconducting wire 1 of the first embodiment, but is different from the method of manufacturing the superconducting wire 1 of the first embodiment in the following points.

Figure 8:
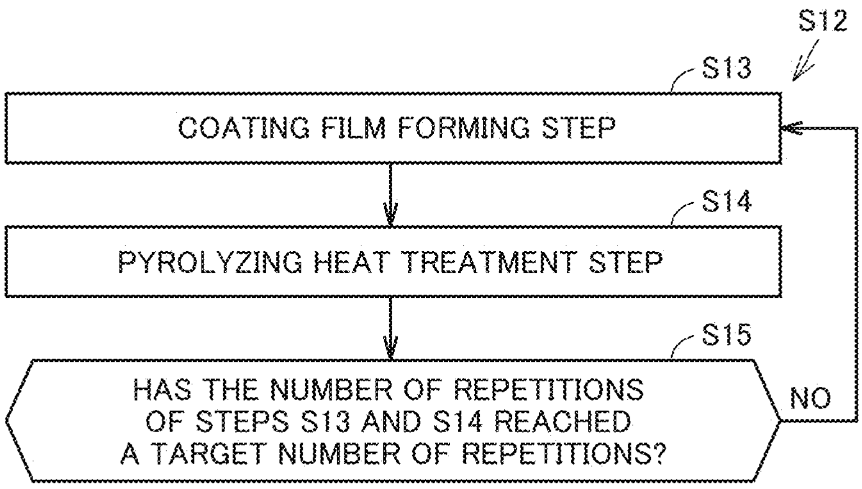
FIG. 8 is a flowchart illustrating a pyrolyzed film forming step according to the second embodiment.

With reference to FIG. 8, in the method of manufacturing the superconducting wire 1 of the present embodiment, the pyrolyzed film forming step (S12) includes repeating the coating film forming step (S13) and the pyrolyzing heat treatment step (S14) for a plurality of times. Thus, a plurality of pyrolyzed films are formed in the pyrolyzed film forming step (S12).

Specifically, the pyrolyzed film forming step (S12) further includes a step S15 in addition to the coating film forming step (S13) and the pyrolyzing heat treatment step (S14). In step S15, it is determined whether or not the number of repetitions of steps S13 and S14 has reached a target number of repetitions. When it is determined in step S15 that the number of repetitions of steps S13 and S14 does not reach the target number of repetitions, steps S13 and S14 are performed again. Thus, the coating film forming step (S13) and the pyrolyzing heat treatment step (S14) are repeated for a plurality of times until the number of repetitions of the steps S13 and S14 reaches the target number of repetitions. When it is determined in step S15 that the number of repetitions of steps S13 and S14 does not reach the target number of repetitions, the solution applied in step S13 is applied onto the already formed pyrolyzed film.

Then, with reference to FIG. 4, the polycrystallization step (S16) and the sintering heat treatment step (S17) are performed by collectively heat-treating the plurality of pyrolyzed films. Therefore, it is possible to reduce the number of times of performing the polycrystallization step (S16) and the sintering heat treatment step (S17) smaller than the number of times of performing the coating film forming step (S13) and the pyrolyzing heat treatment step (S14).

EXAMPLE

Hereinafter, the present disclosure will be described in detail with reference to an example. However, the present disclosure is not limited to the example.

With reference to Table 1, in sample No. 1 to sample No. 37, the support substrate 10 is formed of a substrate 11 which is a cladding material obtained by laminating a copper (Cu) layer and a nickel (Ni) layer on a tape formed of stainless steel, and an intermediate layer 12 which is a laminate of a cerium oxide ($CeO_2$) layer, a yttria-stabilized zirconia (YSZ) layer, and a yttria ($Y_2O_3$) layer. The composition of the metal elements contained in the solution of the metal organic compound is Gd:Ba:Cu=1:2:3, and the oxide superconducting film 20 is formed of $GdBa_2Cu_3O_x$ (GdBCO). The thickness T of the oxide superconducting film 20 is 2 μm.

The manufacturing conditions of sample No. 1 to sample No. 37 are basically the same. Specifically, the pyrolyzed film forming step (S12) is performed at a heat treatment temperature of 500° C. and a heat treatment time of 30 minutes in an atmosphere having an oxygen concentration of 100%. In the sintering heat treatment step (S17), the heat treatment is performed in an argon atmosphere containing oxygen, under the conditions that enable a liquid phase to be generated.

However, the manufacturing conditions of sample No. 1 to sample No. 37 are different in the polycrystallization step (S16). Sample No. 1 to sample No. 7, sample No. 12 to sample No. 17, sample No. 19 to sample No. 23, and sample No. 26 to sample No. 29 were obtained through the polycrystallization step (S16) that satisfies the following three conditions. The first condition is that the polycrystallization step (S16) is performed in an atmosphere having an oxygen concentration of 1% or more. The second condition is that the polycrystallization step (S16) is performed at a heat treatment temperature of 700° C. or higher. The third condition is that the heat treatment time of the pyrolyzed film in the polycrystallization step (S16) is 1 minute or more. On the other hand, sample No. 8, sample No. 9, sample No. 11 and sample No. 18 were obtained through the polycrystallization step (S16) that does not satisfy at least one of the three conditions mentioned above. Sample No. 10 was obtained without performing the polycrystallization step (S16).

Sample No. 30 to sample No. 37 were obtained through the polycrystallization step (S16) that satisfies the following three conditions a, b and c. Condition a is that the polycrystallization step (S16) is performed in an atmosphere having an oxygen concentration of 0.01% or more and less than 1%. Condition b is that the polycrystallization step (S16) is performed at a heat treatment temperature of 650° C. or higher and lower than 800° C. Condition c is that the heat treatment time of the pyrolyzed film in the polycrystallization step (S16) is 1 minute or more.

In order to evaluate the degree of crystal orientation of each oxide superconducting film 20 of sample No. 1 to sample No. 37, the c-axis orientation ratio of each oxide superconducting film 20 of sample No. 1 to sample No. 37 was determined. The c-axis orientation ratio may be determined by the following method.

Figure 9:
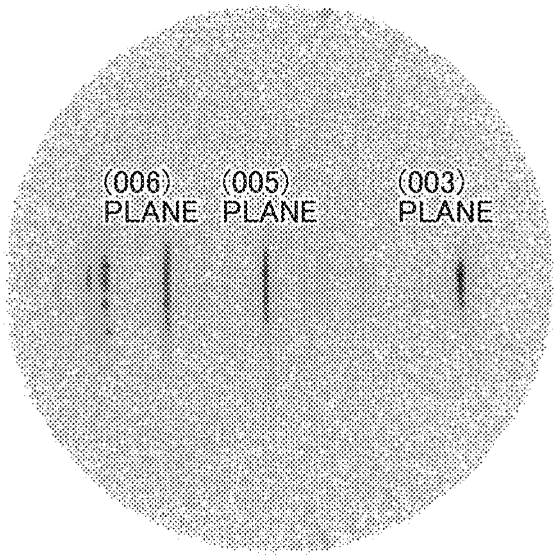
FIG. 9 is a diagram illustrating a two-dimensional X-ray diffraction image of an oxide superconducting film according to an example.

An X-ray diffraction image (see FIG. 9 as an example) of each oxide superconducting film 20 of sample No. 1 to sample No. 37 is obtained by using a two-dimensional detector. In the X-ray diffraction image obtained by using the two-dimensional detector, when a crystal plane to be measured has a higher orientation, it is observed as a short arc-shaped diffraction image in the circumferential direction (x direction), and when a crystal plane to be measured has a lower orientation, it is observed as a ring-shaped diffraction image in the $\chi$ direction. In the X-ray diffraction image obtained by using the two-dimensional detector, the diffraction intensity of each crystal plane to be measured is obtained by integrating the diffraction intensity of each crystal plane to be measured in the $\chi$ direction. D8 DISCOVER (manufactured by Bruker) was used as a two-dimensional detector, and CuKα (having a wavelength of 1.54060 Å) was used as a radiation source.

Figure 10:
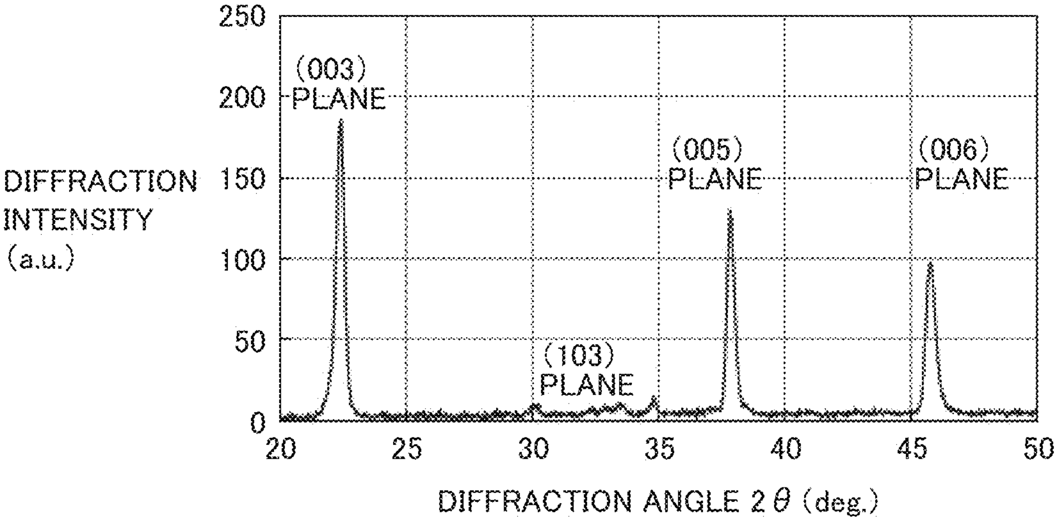
FIG. 10 is an X-ray diffraction chart of an oxide superconducting film according to an example.

As illustrated in FIG. 10, when GdBCO constituting the oxide superconducting film 20 is oriented in the c-axis, a peak corresponding to the (005) plane and a peak corresponding to the (006) plane strongly appear in an X-ray diffraction chart obtained by using the two-dimensional detector. On the other hand, when GdBCO constituting the oxide superconducting film 20 is not oriented in the c-axis, a peak corresponding to the (103) plane or the (013) plane strongly appears in the X-ray diffraction chart obtained by using the two-dimensional detector. Therefore, the c-axis orientation ratio is defined as a value obtained by dividing the intensity of the peak corresponding to the (005) plane by the sum of the intensity of the peak corresponding to the (005) plane and the intensity of the peak corresponding to the (103) plane.

Table 1 shows the c-axis orientation ratio of each oxide superconducting film 20 of sample No. 1 to sample No. 37.

TABLE 1

| Sample No. | Oxygen Concentration (%) | Temperature (° C.) | Time | c-Axis Orientation Ratio (%) |
|---|---|---|---|---|
| 1 | 100 | 800 | 3 min | 99 |
| 2 | 80 | 800 | 3 min | 98 |
| 3 | 50 | 800 | 3 min | 97 |
| 4 | 23 | 800 | 3 min | 98 |
| 5 | 11 | 800 | 3 min | 98 |
| 6 | 10 | 800 | 3 min | 97 |
| 7 | 1 | 800 | 3 min | 96 |
| 8 | 0.1 | 800 | 3 min | 91 |
| 9 | 0.0 | 800 | 3 min | 12 |
| 10 | — | — | — | 12 |
| 11 | 100 | 650 | 3 min | 43 |
| 12 | 100 | 700 | 3 min | 98 |
| 13 | 100 | 750 | 3 min | 97 |
| 14 | 100 | 780 | 3 min | 99 |
| 15 | 100 | 820 | 3 min | 98 |
| 16 | 100 | 860 | 3 min | 99 |
| 17 | 100 | 900 | 3 min | 98 |
| 18 | 100 | 800 | 10 sec | 20 |
| 19 | 100 | 800 | 1 min | 98 |
| 20 | 100 | 800 | 10 min | 97 |
| 21 | 100 | 800 | 30 min | 99 |
| 22 | 100 | 800 | 60 min | 98 |
| 23 | 100 | 800 | 70 min | 97 |
| 24 | 0.1 | 800 | 10 min | 94 |
| 25 | 0.1 | 800 | 70 min | 97 |
| 26 | 100 | 900 | 10 min | 97 |
| 27 | 100 | 900 | 30 min | 99 |
| 28 | 100 | 900 | 60 min | 98 |
| 29 | 100 | 900 | 70 min | 97 |
| 30 | 0.01 | 650 | 3 min | 99 |

TABLE 1-continued

| Sample No. | Oxygen Concentration (%) | Temperature (° C.) | Time | c-Axis Orientation Ratio (%) |
|---|---|---|---|---|
| 31 | 0.01 | 650 | 10 min | 99 |
| 32 | 0.01 | 650 | 30 min | 98 |
| 33 | 0.01 | 650 | 60 min | 97 |
| 34 | 0.01 | 650 | 70 min | 97 |
| 35 | 0.1 | 650 | 3 min | 99 |
| 36 | 0.5 | 650 | 3 min | 98 |
| 37 | 0.8 | 650 | 3 min | 97 |

In the present example, a sample having a c-axis orientation ratio of 95% or more is evaluated as a good sample, i.e., a sample having a high degree of crystal orientation. A sample having a c-axis orientation ratio of less than 95% is evaluated as a defective sample, i.e., a sample having a low degree of crystal orientation. From the c-axis orientation ratios of sample No. 1 to sample No. 7, sample No. 10, sample No. 12 to sample No. 17, sample No. 19 to sample No. 23, and sample No. 26 to sample No. 29, it is obvious that a superconducting wire that includes the oxide superconducting film 20 having a high degree of crystal orientation can be manufactured in a shorter time by performing the polycrystallization step (S16) that satisfies the three conditions mentioned above. From sample No. 24 and sample No. 25, even in an atmosphere having an oxygen concentration of less than 1%, a superconducting wire that includes the oxide superconducting film 20 having a high degree of crystal orientation can be obtained by prolonging the heating time to some extent (for example, 70 minutes) at a heat treatment temperature of 700° C. or higher. Nevertheless, a superconducting wire that includes the oxide superconducting film 20 having a high degree of crystal orientation can be manufactured more efficiently in a shorter time by performing the polycrystallization step (S16) that satisfies the three conditions mentioned above.

For example, from the c-axis orientation ratios of sample No. 1 to sample No. 9, it is obvious that a superconducting wire that includes the oxide superconducting film 20 having a high degree of crystal orientation can be manufactured by performing the polycrystallization step (S16) in an atmosphere having an oxygen concentration of 1% or more. From the c-axis orientation ratios of sample No. 1 and sample No. 11 to sample No. 17, it is obvious that a superconducting wire that includes the oxide superconducting film 20 having a high degree of crystal orientation can be manufactured by performing the polycrystallization step (S16) at a heat treatment temperature of 700° C. or higher. From the c-axis orientation ratios of sample No. 1 and sample No. 18 to sample No. 23, it is obvious that a superconducting wire that includes the oxide superconducting film 20 having a high degree of crystal orientation can be manufactured by performing the polycrystallization step (S16) for a heat treatment time of 1 minute or more. From the comparison between samples of No. 20 to No. 23 and samples of No. 26 to No. 29, it is obvious that a superconducting wire that includes the oxide superconducting film 20 having a high degree of crystal orientation can be obtained even at a heat treatment temperature of 900° C. Sample No. 1 and sample No. 11 to sample No. 23 were obtained by performing the polycrystallization step (S16) in which the atmosphere has an oxygen concentration of 100% and the heat treatment temperature and the heat treatment time are changed. When the polycrystallization step (S16) is performed in an atmosphere having an oxygen concentration of 1% or more and the heat treatment temperature and the heat treatment time are changed accordingly, the same trend of the c-axis orientation ratio may be obtained.

From the c-axis orientation ratios of sample No. 30 to sample No. 37, it is obvious that a superconducting wire that includes the oxide superconducting film 20 having a high degree of crystal orientation can be obtained by setting the heat treatment temperature to 650° C. or higher and lower than 800° C., even in an atmosphere having an oxygen concentration of 0.01% or more and less than 1%.

It should be understood that the first embodiment and the second embodiment disclosed herein are illustrative and not restrictive in all respects. The scope of the present disclosure is defined not by the above-described embodiments but by the claims, and is intended to include all modifications within the scope and meaning equivalent to the claims.

What is claimed is:

1. A method of manufacturing a superconducting wire comprising:

a step of forming an oxide superconducting film on a support substrate, wherein the step of forming the oxide superconducting film includes performing a step of laminating a superconducting layer of an oxide superconducting material for at least one time, the step of laminating the superconducting layer includes a pyrolyzed film forming step, a polycrystallization step, and a sintering heat treatment step, the pyrolyzed film forming step includes performing a coating film forming step and a pyrolyzing heat treatment step for at least one time, in the coating film forming step, a solution of a metal organic compound in an organic solvent is applied to form a coating film, and the metal organic compound is a compound of a metal element constituting the oxide superconducting material and an organic component, in the pyrolyzing heat treatment step, the coating film is heat-treated to thermally decompose the organic component so as to form a pyrolyzed film, in the polycrystallization step, the pyrolyzed film is heat-treated to form a polycrystal layer containing polycrystals of the oxide superconducting material, and in the sintering heat treatment step, the polycrystal layer is heat-treated to orient the polycrystals so as to form the superconducting layer.

2. The method of manufacturing a superconducting wire according to claim 1, wherein the step of forming the oxide superconducting film includes repeating the step of laminating the superconducting layer for a plurality of times.

3. The method of manufacturing a superconducting wire according to claim 1, wherein the pyrolyzed film forming step includes repeating the coating film forming step and the pyrolyzing heat treatment step for a plurality of times.

4. The method of manufacturing a superconducting wire according to claim 1, wherein the polycrystallization step is performed in an atmosphere having an oxygen concentration of 1% or more.

5. The method of manufacturing a superconducting wire according to claim 1, wherein the polycrystallization step is performed at a heat treatment temperature of 700° C. or higher.

6. The method of manufacturing a superconducting wire according to claim 1, wherein a heat treatment time of the pyrolyzed film in the polycrystallization step is 1 minute or more.

7. The method of manufacturing a superconducting wire according to claim 6, wherein the heat treatment time of the pyrolyzed film in the polycrystallization step is 70 minutes or less.

8. The method of manufacturing a superconducting wire according to claim 1, wherein the polycrystallization step is performed in an atmosphere having an oxygen concentration of 0.01% or more and less than 1%, and at a heat treatment temperature of 650° C. or higher and lower than 800° C.

9. The method of manufacturing a superconducting wire according to claim 1, wherein in the sintering heat treatment step, a part or all of the polycrystals grow via a liquid phase.

10. The method of manufacturing a superconducting wire according to claim 1, wherein the oxide superconducting film has a thickness of 1 μm or more.

* * * * *